3,651,232
COMPOSITIONS AND METHODS FOR LOWERING
BLOOD SUGAR LEVELS
Jacob Szmuszkovicz, Kalamazoo, Mich., assignor to The
Upjohn Company, Kalamazoo, Mich.
No Drawing. Continuation-in-part of application Ser. No.
556,892, June 13, 1966. This application Sept. 10, 1968,
Ser. No. 758,664
Int. Cl. A61k 27/00
U.S. Cl. 424—267
22 Claims

ABSTRACT OF THE DISCLOSURE

Therapeutic composition and method for stimulating insulin secretion, reducing the blood sugar level and treating diabetes wherein the principal active ingredient is a compound of the formula:

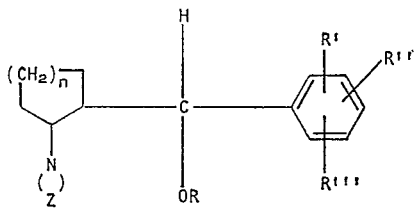

wherein $n$ has the value of 1 to 4, inclusive, wherein

—NZ represents a heterocyclic amino radical containing from 5 to 10 nuclear atoms, inclusive, wherein R is alkyl containing from 1 to 6 carbon atoms, inclusive, wherein R', R" and R''' are selected from the group of substituents consisting of hydrogen, halogen, alkyl and alkoxy containing from 1 to 6 carbon atoms, inclusive, and —CF₃, the acid addition salts, N-oxides and alkyl quaternary ammonium halide salts thereof, in which the alkyl group has from 1 to 12 carbon atoms, inclusive.

CROSS REFERENCES TO RELATED APPLICATION

This application is a continuation-in-part of application Ser. No. 556,892, filed June 13, 1966, now U.S. Pat. No. 3,558,599.

BRIEF SUMMARY OF THE INVENTION

This invention relates to therapeutic compositions and methods. The principal active ingredient is a 1,3-amino alcohol ether and its acid addition salts, N-oxides and alkyl quaternary ammonium halide salts.

DETAILED DESCRIPTION

The primary active ingredients utilized in the novel compositions and method of this invention are ether compounds of the formula:

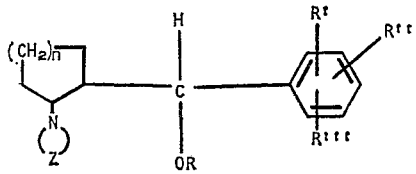

wherein $n$ has the value of 1 to 4 inclusive, wherein

represents a heterocyclic amino radical containing from 5 to 10 nuclear atoms, inclusive, wherein R is alkyl containing from 1 to 6 carbon atoms, inclusive, wherein R', R" and R''' are selected from the group of substituents consisting of hydrogen, halogen, alkyl and alkoxy containing from 1 to 6 carbon atoms, inclusive, and —CF₃, the acid addition salts, N-oxides and alkyl quaternary ammonium halide salts thereof, in which the alkyl group has from 1 to 12 carbon atoms, inclusive.

Examples of the cycloalkyl radical illustratively represented by the formula:

are cyclopentyl, cyclohexyl, cycloheptyl and cyclooctyl.
Examples of the heterocyclic amino radical

having from 5 to 10 nuclear atoms, include: pyrrolidino, 2 - methylpyrrolidino, 2 - ethylpyrrolidino, 2,2 - dimethylpyrrolidino, 3,4 - dimethylpyrrolidino, 2 - isopropylpyrrolidino, 2 - sec.butylpyrrolidino, and like alkylpyrrolidino groups, morpholino, 2 - ethylmorpholino, 2-ethyl - 5 - methylmorpholino, 3,3 - dimethylmorpholino, thiamorpholino, 3-methylthiamorpholino, 2,3,6-trimethylthiamorpholino, 4-methylpiperazino, 4-butylpiperazino, piperidino, 2 - methylpiperidino, 3 - methylpiperidino, 4 - methylpiperidino, 4 - propylpiperidino, 2 - propylpiperidino, 4 -isopropylpiperidino, and like alkylpiperidino groups, hexamethyleneimino, 2 - methylhexamethyleneimino, 3,6 - dimethylhexamethyleneimino, homomorpholino, 1,2,3,4 - tetrahydroquinolyl, heptamethyleneimino, octamethyleneimino, 3-azadicyclo[3.2.2]nonan-3-yl, 2-azabicyclo[2.2.2]octan-2-yl, and the like.

Illustrative examples of alkyl groups having from 1 to 6 carbon atoms are methyl, ethyl, propyl, isopropyl, butyl, isobutyl, tertiary butyl, pentyl, 2-methylbutyl, neopentyl, hexyl, 2-methylpentyl, 3-methylpentyl and the like. Alkyl groups for the quaternary ammonium halide salts include, in addition to the preceding alkyl groups, others such as heptyl, octyl, nonyl, decyl, undecyl, dodecyl and the like. The halogen moiety in such salts includes iodine, bromine and chlorine.

Under halogen substituents for R', R" and R''' is understood fluorine, chlorine, bromine and iodine.

The active ingredients exist in different stereoisomeric forms such as geometric and optically active forms (e.g., the compounds have at least three asymmetric carbon atoms) as well as in racemic mixtures. These optically active forms and racemic mixtures and geometric isomers are also encompassed by this invention.

The active ingredients of the present invention can be produced according to processes disclosed in the above-indicated parent application and published in Belgian Pat. No. 699,844 issued Dec. 13, 1967 and South African Pat. No. 2420/67 issued Jan. 3, 1968. See also Szmuszkovicz and Skaletzky, J. Org. Chem. 32, 3300 (1967).

Therapeutic compositions containing these active ingredients have been shown to possess blood sugar lowering, insulin secretion stimulating, and anti-diabetic properties in man and animals. The hypoglycemic activity has been demonstrated in standard test animals such as rats. The standard test used is described in Gerritsen and Dulin, Diabetes 14, 507 (1965). The blood sugar lowering and plasma insulin increasing activities have been demonstrated in normal man. The favorable therapeutic ratio possessed by the compositions of the invention with respect to these activities in relation to undesirable side effects make these compositions useful for the treatment and control of diabetes or other conditions involving abnormal carbohydrate metabolism in mammals, including man. In the treatment of human diabetes, the oral route is preferred.

In utilizing the compositions and practicing the method of this invention, the exact schedule of administration in humans and animals is determined individually according to the subject's age, weight, response to the medication and nature and severity of the condition being treated.

In adapting the active ingredient for use in mammals, including humans, the novel compositions are suitably presented for administration in dosage unit form such as tablets, pills, capsules, powders, wafers, cachets, granules, oral dispersions including elixirs and syrups or other conventional oral dosage forms. Sterile solutions or suspensions are presented for parenteral use.

The compositions suited for oral use include solid and liquid compositions. The solid compositions may be in the form of tablets, coated or uncoated; capsules, hard or soft; powders; granules; pills and the like. The liquid compositions can be in the form of emulsions, solutions, and suspensions, especially syrups and elixirs.

The tablets contain the active ingredient in the required amount with pharmaceutical diluents or excipients, binders, disintegrators, and lubricants. The active ingredient is suitably mixed with a mineral solid (for example calcium sulfate and dicalcium phosphate) and the like to form the basic powder mixture. The said mixture can be granulated by wetting with a protein binder (such as gelatin solution), and the dried granules mixed with starch, talc and stearate before compressing into tablets of the proper size. As an alternative to granulating, the mixture can be slugged through the tablet machine and the slugs broken down into suitable sized granules prior to formation of the tablets. The tablets can be coated or uncoated.

The capsules for oral use can comprise a mixture of the active ingredient in combination with a pharmaceutical diluent and a gelatin sheath enclosing said mixture. The capsules can be in the form of soft capsules enclosing the active ingredient in the required amount with suitable diluents, for example edible oils. Suitable diluents for the hard capsules comprise talc, starch, dicalcium phosphate and the like and can also include lubricants (for example stearic acid or stearate salts).

The powders are prepared by comminuting the active ingredient in the required amount and mixing with an acceptable diluent (for example, starch, talc, dicalcium phosphate and the like), and include sweetening and flavoring agents (for example, saccharin, a cyclamate salt or flavoring oil).

If the active ingredient is in an insoluble form, suitable suspending agents, for example methylcellulose, polyvinyl pyrrolidone, tragacanth or acacia can be included.

For the treatment of animals by oral administration, the therapeutic ingredient is conveniently prepared in the form of a food premix. The food premix can comprise the active ingredient in admixture with an edible pharmaceutical diluent of the types previously mentioned such as starch, oatmeal, flour, calcium carbonate, talc, dried fish meal and the like non-toxic, orally acceptable pharmaceutical diluents. The prepared premix is then conveniently added to the regular feed, thereby providing medication to the animal or bird in the course of feeding.

As set forth above, the liquid oral compositions include emulsions, solutions, and suspensions, especially in the form of syrups and elixirs.

Solutions of the active ingredient can be prepared in water or in water suitably diluted with various pharmaceutically acceptable solvents (for example, ethanol, glycerin, edible polyols and the like; a suitable polyol is propylene glycol). Under ordinary conditions of storage and use, solutions contain a suitable preservative to prevent the growth of microorganisms. Likewise, sweetening, coloring, and flavoring agents are added to assure patient acceptance.

Suspensions of insoluble active ingredients are conveniently prepared in water and aqueous solutions of orally acceptable liquids, such as used in the solutions above. The active ingredient is normally comminuted to a fine particle size for use in the suspension which advantageously contains soluble suspending agents, for example, methylcellulose, tragacanth, acacia, polyvinyl pyrrolidone, polyvinyl alcohol, and the like. As with the other liquid oral compositions, preservatives, coloring agents, sweeteners and flavoring agents are added for satisfactory storage and use.

The syrups contain the active ingredient in the required amount in an aqueous solution containing a sweetening agent, for example, saccharin or cyclamate salts. Colors, flavors and preservatives are added for satisfactory storage and use.

The elixirs contain the active ingredient in the required amount in a hydro-alcoholic solution. Sweeteners, colors, flavors and preservatives are also necessary for satisfactory administration.

As stated above, the pharmaceutical compositions can be presented in forms suited for injection use, which forms include sterile aqueous solutions or suspensions and sterile powders for the extemporaneous preparation of sterile injectable solutions or suspensions. Regardless of the particular form of a given product, certain basic requirements exist. For example, in all cases the form must be sterile and must be fluid to the extent necessary for syringeability. It must be stable under the conditions of manufacture and storage and must be preserved against contaminating action of microorganisms such as bacteria and fungi. The carrier must also be non-antigenic. Depending upon the particular active ingreident the basic solvent or suspending liquid contains water, vegetable oils, ethanol, polyols (for example glycerol, propylene glycol, and liquid polyethylene glycol, and the like), and suitable mixtures thereof. The proper fluidity can be maintained, for example by the use of a coating such as lecithin, by the maintenance of the required particle size in the case of suspensions and by the use of surfactants (for example, a condensation product of ethylene oxide with fatty acids or fatty alcohols, partial esters of fatty acids and a hexitol anhydride, and polyoxyethylene condensation products of the esters) and suspending agents (for example gelatin, polyvinyl pyrrolidine, and methylcellulose). In the case of sterile powders solid polyethylene glycol can be used. Depending upon the particular active ingredient, the stability is maintained by the control of pH, the use of buffers, and stabilizers (for example, antioxidants, such as bisulfites and metabisulfites). Microorganisms can be controlled by various bactericidal and fungicidal agents (for example, parabens, chlorobutanol, benzyl alcohol, phenol, sorbic acid, thimerosal, and the like). In many cases, it will be preferable to include isotonic agents (for example, sodium chloride). Prolonged action of the injectable compositions can be brought about by the use in the compositions of agents capable of delaying absorption (for example, aluminum monostearate and gelatin).

Sterile injectable solutions are prepared by incorporating teh active ingredient in the required amount in the appropriate solvent with various of the other ingredients enumerated above, as required, followed by heat or filter sterilization. Generally, suspensions are prepared by incorporating the previously sterilized active ingredient into a sterile veihcle which contains the basic suspending liquid and the required other ingredients from those enumerated above.

In the case of sterile powders for the preparation of sterile injectable solutions, the preferred method of preparation is the freeze-drying technique which yields a powder of the active ingredient plus any additional desired ingredients from a previously sterile-filtered solution thereof. In the case of sterile powders for the preparation of sterile injectable suspensions, the said powders are preferably sterilized by the use of a gas (for example, ethylene oxide) and subsequently incorporated, with the required additional ingredients and in the proper particle size, into the basic powder for later reconstitution with the desired suspending liquid which must itself be sterile.

The term "dosage unit form" as used in the specification and claims refers to physicaly discrete units suitable as unitary dosages for human subjects and animals, each unit containing a predetermined quantity of active material calculated to produce the desired therapeutic effect in association with the required pharmaceutical diluent, carrier or vehicle. The specifications for the novel dosage unit forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable dosage unit forms in accord with this invention are tablets, capsules, powder packets, wafers, cachets, vials, teaspoonfuls, tablespoonfuls, dropperfuls, segregated multiples of any of the foregoing, and other forms as herein described.

The dosage of the active ingredient for treatment of the indicated conditions depends on the age, weight, and condition of the subject; the particular condition being treated and its severity; the particular form of the active ingredient employed; the route of administration and the subject's response to the medication. A daily dose of from about 0.2 to 20 mg./kg. or a dose of from about 10 mg. to about 300 mg. given 1 to 3 times a day embraces the safe and effective range for the treatment of most conditions for which the active ingredient is effective.

The active ingredient is compounded in therapeutically effective amounts with a suitable pharmaceutical carrier in dosage unit form as hereinbefore described for convenient and effective administration; a dosage unit form can contain the active ingredient in amounts ranging from about 10 to 300 mg. per unit. Expressed in terms of concentration, the active ingredient can be present in a concentration of from 5% to 95% w./w. of the composition. The dosage of compositions containing the active ingredient and one or more other active ingredients is to be determined with reference to the usual dosage of each such ingredient.

In the preferred embodiment of this invention a dosage unit form can contain the active ingredient in amounts of from 50 mg. to about 250 mg. per unit in combination with a solid pharmaceutical carrier (as hereinbefore described) for oral administration.

The active ingredient is compounded with a suitable liquid oral pharmaceutical carrier in concentrations suitable for sub-dividing into dosage unit forms for convenient and effective oral administration. Suitable concentrations would provide from about 2 mg. per ml. to about 50 mg. per ml. Thus a teaspoonful (approximately 5 ml.), a tablespoonful (approximately 15 ml.) or a dropperful (approximately 0.6 ml.) would provide suitable dosage for unitary administration. The preferred dosage unit for oral administration in liquid form is a teaspoonful and the preferred concentration for such a dosage unit is from about 2 mg. per ml. to about 50 mg. per ml.

Suitable concentrations for injection use range from about 5% to about 25% weight by volume of the active ingredient in a sterile injectable diluent.

The following preparations and examples illustrate the best mode contemplated by the inventor for carrying out the invention but are not to be construed as limiting the scope thereof.

PREPARATION 1

2-(p-methoxybenzoyl)cyclohexanone

A solution of 167 g. (0.98 mole) of p-anisoyl chloride in 480 ml. of chloroform was added during a period of 1.5 hours to a solution of 371.7 g. (2.46 moles) of distilled 1-pyrrolidino-1-cyclohexene in 1260 ml. of chloroform. The temperature was kept between 5–10° C. by cooling with ice. After stirring for a period of about 20 hours at room temperature, the mixture was decomposed by addition of 1800 ml. of 10% aqueous hydrochloric acid over a period of 20 minutes. The mixtures was then stirred for 2 hours, allowed to settle, the organic layer was separated and the aqueous layer extracted twice with 250-ml. portions of chloroform. The original organic layer and the chloroform extracts were combined, washed with water, saturated salt solution, and then dried by passage through anhydrous sodium sulfate and evaporated. The residue resulting from the above evaporation was a brown oil which was dissolved in 1 l. of ethanol and added to a solution of 344 g. of cupric acetate monohydrate in 5200 ml. of water, preheated to 65° C. The mixture was stirred for 0.5 hour, cooled to room temperature and filtered. The obtained precipitate was washed with water and then with ether. It was then dissolved in 800 ml. of chloroform and added to a solution of 300 ml. of concentrated hydrochloric acid in 1100 ml. of water. The mixture was stirred for 1 hour. The organic layer was separated, and the aqueous layer was extracted once with chloroform. The combined chloroform original layer and extract were washed with water, saturated salt solution, dried by passing through anhydrous sodium sulfate and evaporated, to give a solid which was crystallized for 7 l. of methanol, yielding 136.5 g. of 2-(p-methoxybenzoyl) cyclohexanone having a melting point of 115–128° C. A second crop of 26 g., melting point 116–127° C. was obtained from the mother liquor; the total yield was 71%. A recrystallized sample from methanol of 2-(p-methoxybenzoyl) cyclohexanone had a melting point of 117–122° C.

Analysis.—Calcd. for $C_{14}H_{16}O_3$ (percent): C, 72.39; H, 6.94. Found (percent): C, 72.30; H, 7.05.

PREPARATION 2 p-Methoxyphenyl 2-piperidino-1-cyclohexen-1-yl ketone

A mixture consisting of 23.2 g. (0.1 mole) of 2-(p-methoxybenzoyl)cyclohexanone, 25.5 g. (0.3 mole) of piperidine, 800 ml. of toluene, and 0.67 g. of p-toluenesulfonic acid was refluxed for 23 hours under nitrogen using an azeotropic separator (during this time water was collected). The mixture was thereupon evaporated to dryness to give p-methoxyphenyl 2-piperidino-1-cyclohexen-1-yl ketone.

PREPARATION 3

Cis-A-α-(p-methoxyphenyl)-2-piperidinocyclohexanemethanol

A solution of p-methoxyphenyl 2-piperidino-1-cyclohexen-1-yl ketone (obtained from a synthesis of the same scale as shown in Preparation 2) in 300 ml. of ethanol was hydrogenated in the presence of 1 g. of platinum oxide catalyst under an initial hydrogen pressure of 51 pounds. Two molar equivalents of hydrogen were absorbed during a period of 2.5 hours. The mixture was filtered through Filtercel diatomaceous earth. The filtrate was then evaporated to dryness and the residue dissolved in 250 ml. of ether. The ether solution upon standing produced crystals which were recovered by filtration and washed with ether. One g. of material was obtained having a melting point 152–168° C. This material after recrystallization from methanol-ether was found to be the p-toluenesulfonic acid salt of cis-A-α-(p-methoxyphenyl)-2-piperidinocyclohexanemethanol of melting point 182–183° C.

Ultraviolet: $\lambda_{max}$. 223 (21,800); sh. 256 (705); sh. 262 (980); sh. 268 (1,360); 275 (1,530); 282 (1,280).

Analysis.—Calcd. for $C_{26}H_{37}NO_5S$ (percent): C, 65.66; H, 7.84; N, 2.95; S, 6.74. Found (percent): C, 65.27; H, 7.88; N, 2.89; S, 6.86.

The ethereal filtrate above was stirred with 200 ml. of 10% aqueous acetic acid for ½ hour. The aqueous layer was separated, then extracted once with ether, and the ether extract discarded. The aqueous layer was then cooled, basified with aqueous sodium hydroxide solution and extracted with methylene chloride (four portions of 75 ml. each). The extracts were combined, washed with water, saturated salt solution, dried by passing the solution through anhydrous sodium sulfate and evaporated to give 22.5 g. of oily material. This material was recrystallized from petroleum ether to give 21.4 g. (71% yield) of cis-A-α-(p-methoxyphenyl)-2-piperidinocyclohexanemethanol of melting point 78–80° C.

Ultraviolet: λ_max. 225 (11,500); 275 (1,500); 283 (1,300).

Analysis.—Calcd. for $C_{19}H_{29}NO_2$ (percent): C, 75.20; H, 9.63; N, 4.62. Found (percent): C, 75.17; H, 9.88; N, 4.47.

Treating cis-A-α-(p-methoxyphenyl)-2-piperidinocyclohexanemethanol with ethereal hydrogen chloride gave cis-A-α-(p-methoxyphenyl) - 2-piperidinocyclohexanemethanol hydrochloride of melting point 235–236° C.

It is pointed out that compounds in different isomeric forms appear herein, e.g., p-methoxyphenyl 2-piperidinocyclohexyl ketone can be in cis or trans isomeric forms:

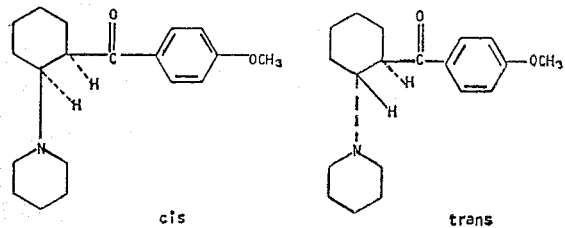

PREPARATION 4

Cis-p-methoxyphenyl 2-piperidinocyclohexy ketone

A mixture of 139 g. (0.6 mole) of 2-(p-methoxybenzoyl)cyclohexanone, 153 g. (1.8 moles) of piperidine, 4800 ml. of toluene and 0.02 g. of p-toluenesulfonic acid monohydrate was refluxed for 20 hours in a vessel equipped with an azeotropic separator. A total of 10.1 ml. of water was collected. The reaction mixture was evaporated to dryness on a steam bath to give a residue which was dissolved in 1200 ml. of ethanol and the thus-obtained solution was divided into four equal parts. Each part was hydrogenated in the presence of 1.5 g. of platinum oxide at an initial pressure of 50 pounds of hydrogen. Hydrogenation was stopped after the uptake of 1 molar equivalent. The time required for this procedure was 25 minutes to 55 minutes. Thereafter, the combined mixture was filtered through diatomaceous earth, and the solution was evaporated to dryness. A deep yellow oil was obtained which was dissolved in 1200 ml. of ether and allowed to stand for 15 minutes. The mixture was thereupon filtered and a precipitate was collected weighing 5.3 g. The ethereal filtrate was stirred with 1 l. of 10% aqueous hydrochloric acid for 45 minutes. The acidic layer was separated, filtered and basified with 20% aqueous sodium hydroxide solution. The resulting oil which solidified after a short time was extracted with methylene chloride (five portions of 200 ml. each), the extracts were combined, washed with water, then with saturated salt solution, dried over anhydrous sodium sulfate and evaporated to give a crude product of 116 g. Recrystallization of this crude product from petroleum ether gave 75 g. (42% yield) of colorless needles of cis-p-methoxyphenyl 2-piperidinocyclohexyl ketone having a melting point of 86–88° C. Further recrystallization from petroleum ether for analytical purposes gave cis-p-methoxyphenyl 2-piperidinocyclohexyl ketone of melting point 86.5–88° C.

Ultraviolet: λ_max. 217 (11,850); 273 (15,800); 278 (15,500).

Analysis.—Calcd. for $C_{19}H_{27}NO_2$ (percent): C, 75.71; H, 9.03; N, 4.65. Found (percent): C, 76.19; H, 9.19; N, 4.88.

PREPARATION 5

Cis-A-α-(methoxyphenyl)-2-piperidinocyclohexanemethanol

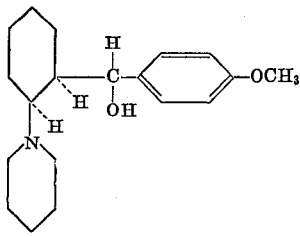

A solution of cis-p-methoxyphenyl 2-piperidinocyclohexyl ketone (3.01 g.; 0.01 mole) in 100 ml. of ethanol was subjected to hydrogenation in the presence of platinum oxide catalyst (0.3 g.) at an initial pressure of 53 pounds of hydrogen. One molar equivalent was absorbed in 25 hours. The mixture was filtered, and the filtrate was evaporated to dryness, giving 3.1 g. of an oily material. A 2.9-g. portion of this oil was chromatographed over 150 g. of Florisil (anhydrous magnesium silicate) using 150-ml. portions of an eluant of 6% acetone-94% Skellysolve B hexanes. The first four fractions containing 0.126 g. were discarded. The next eight fractions (150 ml. each) using an eluant of 12% acetone-88% Skellysolve B hexanes gave 2.294 g. of solid melting at 81–82° C. Fractions 13–16 (150 ml. each) using an eluant of 25% acetone-75% Skellysolve B hexanes gave 0.309 g. of solid material melting at 81–82° C. The solids were combined and recrystallized from petroleum ether (boiling range 30–60° C.) to give in two crops 2.4 g. of cis-A-α-(p-methoxyphenyl)-2-piperidinocyclohexanemethanol of melting point 81–82.5° C.

Since the carbon atom of the methanol group of α-(p-methoxyphenyl) - 2 - piperidinocyclohexanemethanol is asymmetric, it is obvious that besides the cis-A-alcohol, the cis-B-alcohol is possible (Preparation 6).

PREPARATION 6

Cis-A and cis-B-α-(p-methoxyphenyl)-2-piperidinocyclohexanemethanol

Solid cis-p-methoxyphenyl 2-piperidinocyclohexyl ketone (3.01 g.; 0.01 mole) was added to an ice-cooled solution of sodium borohydride (3 g.) in 100 ml. of ethanol. The reaction mixture was then stirred at room temperature (22–25° C.) for a period of 16 hours. It was evaporated to dryness in vacuo at 40° C. To the residue was added 100 ml. of water, and the mixture was then stirred for 30 minutes. The resulting oil was extracted three times with ether. The ether extracts were combined, washed with water, the water discarded, then washed with four 25-ml. portions of 10% aqueous acetic acid. The acidic extract was washed once with ether, and the ether discarded. The washed extract was then cooled in ice and basified with 15% sodium hydroxide solution. The reaction mixture was then extracted three times with ether, the extracts combined, washed with water, then with saturated salt solution, dried over anhydrous sodium sulfate and evaporated to give 3 g. of an oil. The oily material was crystallized from 50 ml. of petroleum ether (boiling range 30–60° C.) to give 1.8 g. of cis-A-α-(p-methoxyphenyl)-2-piperidinocyclohexanemethanol, melting point 78–80° C.

The filtrate was evaporated to dryness, and the residue was chromatographed on 60 g. of Florisil (anhydrous magnesium silicate). The column of Florisil was eluated twice with 150-ml. portions of an eluant consisting of 6% acetone and 94% Skellysolve B hexanes; four times with 150-ml. portions of an eluant consisting of 12% acetone and 88% Skellysolve B hexanes; and finally three times with 150-ml. portions of a 20% acetone-80% Skellysolve B hexanes solution, giving 0.576 g. of cis-A-alcohol, which after recrystallization from petroleum ether had a melting point of 80–81° C. Elution with 50% acetone-50% Skellysolve B hexanes (four portions of 150 ml. each) and acetone (two portions of 250 ml. each) gave 0.316 g. of cis-B-α-(p-methoxyphenyl) - 2 - piperidinocyclohexanemethanol, which after recrystallization from ether weighed 0.1 g. and had a melting point of 135–136° C.

These cis alcohols A and B can also be produced from cis-p-methoxyphenyl 2-piperidinocyclohexyl ketone by reduction with lithium aluminum hydride.

PREPARATION 7

Cis-A- and cis-B-α-(p-methoxyphenyl)-2-piperidinocyclohexanemethanol

A solution of 0.9 g. (3 mmoles) of cis-p-methoxyphenyl 2-piperidinocyclohexyl ketone in 25 ml. of ether was added dropwise during 5 minutes to a solution containing 1 g. of lithium aluminum hydride in 100 ml. of ether. The mixture was stirred during a period of 22 hours and was then decomposed by successive addition of 1 ml. of water, 1 ml. of 15% aqueous sodium hydroxide and 3 ml. of water. The resulting suspension was stirred for a period of 2 hours. It was then filtered and the solid washed with ether. The combined filtrate and washings were extracted with three portions of 30 ml. each of 10% aqueous acetic acid, and the combined acidic extracts were backwashed once with ether. The acidic extract was then basified with 15% aqueous sodium hydroxide and extracted three times with ether. The combined ether extracts were washed with water, saturated salt solution, and dried by passage through anhydrous sodium sulfate. The resulting dried solution was evaporated to give 0.77 g. of a colorless oil. This oil was chromatographed over 35 g. of Florisil (anhydrous magnesium silicate) by eluting with an eluant consisting of 6% acetone and 94% Skellysolve B hexanes. The first four fractions of 150 ml. each gave 0.607 g. (67% yield) of cis-A-α-(p-methoxyphenyl)-2-piperidinocyclohexanemethanol (melting point 80–81° C.). Further elution was an eluant consisting of 12% acetone and 88% Skellysolve B hexanes gave, in four 150-ml. fractions, 0.209 g. of cis-B-α-(p-methoxyphenyl)-2-piperidinocyclohexanemethanol of melting point 134–135° C. (23% yield).

PREPARATION 8

Cis-B-1-[2-(α,p-dimethoxybenzyl)cyclohexyl]-piperidine and hydrochloride thereof A solution of cis-A-α-(p-methoxyphenyl)-2-piperidinocyclohexanemethanol (3.0 g.; 0.01 mole) in 50 ml. of methanol was treated with a solution of 5 g. of hydrogen chloride in 50 ml. of methanol, and an additional 100 ml. of methanol was added. The solution was allowed to stand for 18 hours at about 25° C. and was then evaporated to dryness at 45° C. under reduced pressure. The oily residue was dissolved in 50 ml. of water; the solution was basified with aqueous sodium hydroxide solution and extracted with ether. The extract was washed with water, then with saturated sodium chloride solution, dried through anhydrous sodium sulfate, and evaporated to dryness, to obtain 3.0 g. (95% yield) of cis-B-1-[2-(α,p-dimethoxybenzyl)cyclohexyl]-piperidine of melting point 75–77° C. Recrystallization from ethanol gave 2.3 g. of this compound, melting point 81–82° C.

Ultraviolet: $\lambda_{max.}$ 226 (13,200); 275 (1,460); 282 (1,210).

Analysis.—Calcd. for $C_{20}H_{31}NO_2$ (percent): C, 75.67; H, 9.84; N, 4.41. Found (percent): C, 75.70; H, 10.06; N, 4.15.

A solution of 10.7 g. (0.0354 mole) of cis-B-1-[2-α,p-dimethoxybenzyl)cyclohexyl]piperidine in 50 ml. of ether was treated wtih 40 ml. of 1.3 N ethereal hydrogen chloride solution. The resulting solid was crystallized from 25 ml. of methylene chloride and 50 ml. of ether to give 9.3 g. of cis-B-1-[2-(α,p-dimethoxybenzyl)cyclohexyl]piperidine hydrochloride of melting point 209–211° C.

Ultraviolet: $\lambda_{max.}$ 227 (12,500); 275 (1,400); 281 (1,200).

Analysis.—Calcd. for $C_{20}H_{31}NO_2 \cdot HCl$ (percent): C, 67.87; H, 9.11; Cl, 10.02; N, 3.96. Found (percent): C, 67.41; H, 9.31; Cl, 10.47; N, 3.83.

PREPARATION 9

Cis-B-1-[2-(α-p-dimethoxybenzyl)cyclohexyl]piperidine and its methiodide

A solution of 4 ml. of butyl lithium (0.01 mole) in hexane was added during 2 minutes to a solution of 3.03 g. (0.01 mole) of cis - B - α-(p-methoxyphenyl)-2-piperidinocyclohexanemethanol in 30 ml. of purified tetrahydrofuran. The mixture was stirred at room temperature for 30 minutes and then cooled in a solid carbon dioxide bath at —70° C. To this solution was added a solution of methyl iodide (1.42 g.; 0.01 mole) in 10 ml. of tetrahydrofuran, dropwise, over a period of 10 minutes. The mixture was stirred at —70° C. for a period of 1.5 hours and then at room temperature for 19 hours. To the solution was thereupon added water (50 ml.) and the solution was then extracted with three portions of 75 ml. each of methylene chloride. The organic extracts were combined, dried by passage through anhydrous sodium sulfate and evaporated to give 2.7 g. of crude product. The crude product was dissolved in 20 ml. of methylene chloride and chromatographed over 135 g. of neutral alumina. The material was first eluted with eight portions of 250 ml. of a 5% ether-95% Skellysolve B hexanes solution. After evaporation of the combined eluates, 1.523 g. of solid material, melting between 82–84° C., was obtained. Further elution with two portions of 250 ml. each of 50% ether-50% Skellysolve B hexanes and with two portions of 250 ml. each of 75% ether-25% Skellysolve B hexanes gave a total of 0.204 g. of solid material after evaporation of the combined eluates. The above fractions were all combined and recrystallized from ethanol to give 0.644 g. of cis-B-1-[2-(α,p-dimethoxybenzyl)cyclohexyl] piperidine of melting point 84–85.5° C. This free base was identical with the free base obtained in Preparation 8.

Further elution of the column with 250 ml. of methanol gave 1.446 g. of material which was crystallized from methanol-ether overnight in the refrigerator to give 0.252 g. of the methiodide of cis-B-1-[2-(α,p-dimethoxybenzyl)cyclohexyl]piperidine, melting after another recrystallization from methanol-ether at 217–218° C.

Ultraviolet: $\lambda_{max.}$ 223 (24,000); 275 (1,390); 281 (1,280).

Analysis.—Calcd. for $C_{21}H_{34}INO_2$ (percent): C, 54.90; H, 7.46; I, 27.63; N, 3.05. Found (percent): C, 55.03; H, 7.68; I, 27.63; N, 3.23.

PREPARATION 10

Cis-A-1-[2-(α,p-dimethoxybenzyl)cyclohexyl]piperidine hydrochloride methanol solvate An ether solution of cis - A - α - (p-methoxyphenyl)-2-piperidinocyclohexanemethanol was treated with a solution of sodium amide in liquid ammonia and thereupon with a solution of methyl iodide in ether at about —70° C. to give cis-A-1-[2-(α,p-dimethoxybenzyl)cyclohexyl] piperidine recovered as hydrochloride methanol solvate of melting point 196.5–197.5° C.

Ultraviolet: 227 (11,400); 274 (1,380); 281 (1,200).

Analysis.—Calcd. for $C_{20}H_{31}NO_2 \cdot CH_3OH \cdot HCl$ (percent): C, 65.34; H, 9.40; Cl, 9.19; N, 3.63. Found (percent): C, 65.50; H, 9.28; Cl, 8.50; N, 4.03.

PREPARATION 11

1-[2-(α-ethoxy-p-methoxybenzyl)cyclohexyl]piperidine (cis-B isomer) and hydrochloride thereof A solution of 26 g. of hydrogen chloride in 200 ml. of ethanol was added to a solution of cis-A-α-(p-methoxyphenyl)-2-piperidinocyclohexanemethanol (12.1 g.; 0.03 mole) in 1200 ml. of ethanol. After 20 hours, the mixture was filtered, and a precipitate collected of melting point 232–233° C. This material was unreacted starting material. The filtrate was cooled, basified with 20% sodium hydroxide and evaporated to eliminate the ethanol. Thereafter 250 ml. of water was added to the solution and the solution extracted with methylene chloride to give 11.9 g. of a yellow oil. The yellow oil was dissolved in 50 ml. of methylene chloride and chromatographed on 590 g. of neutral alumina using a solvent mixture of 12% ether-88% Skellysolve B hexanes (6 portions of 250 ml. each). The eluates were combined and evaporated to give 3.80 g. of cis-B-1-[2-(α-ethoxy-p-methoxybenzyl)cyclohexyl]piperidine as an oil.

*Ultraviolet:* 227.5 (12,200); 268 (1,100); 276 (1,460); 283 (1,200).

*Analysis.*—Calcd. for $C_{21}H_{33}NO_2$ (percent): C, 76.09; H, 10.03; N, 4.23. Found (percent): C, 76.14; H, 9.71; N, 4.31.

The hydrochloride of this base was prepared by suspending 2.5 g. of the cis-B-1-[2-(α-ethoxy-p-methoxybenzyl)cyclohexyl]piperidine in 20 ml. of isopropanol and adding 7.0 ml. of 1.2 N ethereal hydrogen chloride solution. The mixture was warmed on the steam bath until solution was complete, filtered and the filtrate diluted with 125 ml. of ether to give cis-B-1-[2-(α-ethoxy-p-methoxybenzyl)cyclohexyl]piperidine hydrochloride of melting point 209–210° C.

PREPARATION 12

*Resolution of cis-B-1-[2-(α,p-dimethoxybenzyl)cyclohexyl]piperidine*

(A) A mixture of 16.0 g. of cis-B-1-[2-(α,p-dimethoxybenzyl)cyclohexyl]piperidine (Preparations 8 and 9), 19.5 g. of O,O'-di-p-toluoyl-L-tartaric acid, 25 ml. of absolute ethanol and 25 ml. of ethyl acetate was heated until all solids were dissolved. Ethyl acetate (200 ml.) was added and the hot solution filtered. On standing overnight, a white solid separated which was recovered by filtration, then washed with 50 ml. of ethyl acetate and dried in vacuo; 11.5 g. of material was obtained of melting point 151–152° C. which was recrystallized from a mixture of absolute ethanol (25 ml.) and ethyl acetate (110 ml.) to give the O,O'-di-p-toluoyl-L-tartrate of (−)-cis - B - 1 - [2 - (α,p-dimethoxybenzyl)cyclohexyl]piperidine of melting point 159–160° C.; $[\alpha]_D^{25}$ −103° in methanol.

*Analysis.*—Calcd. for $C_{20}H_{31}NO_2 \cdot C_{20}H_{18}O_8$ (percent): C, 68.26; H, 7.02; N, 1.99. Found (percent): C, 67.99; H, 6.78; N, 2.07.

Ten g. of the above salt was treated with 100 ml. of 5% aqueous sodium carbonate solution, and the mixture was extracted with methylene chloride. The methylene chloride layer was washed with saturated sodium chloride solution, dried over anhydrous magnesium sulfate, and evaporated in vacuo to give 4.56 g. of a white solid. This white solid was recrystallized from 30 ml. of absolute ethanol (twice) to give 3.2 g. of (−)-cis-B-1-[2-(α,p-dimethoxybenzyl)cyclohexyl]piperidine of melting point 106.5–107.5° C. Optical rotation $[\alpha]_D^{25}$ −65° in chloroform.

*Analysis.*—Calcd. for $C_{20}H_{31}NO_2$ (percent): C, 75.67; H, 9.84; N, 4.41. Found (percent): C, 75.49; H, 10.00; N, 4.68.

The hydrochloride of this base was prepared by suspending 2.5 g. of the (−)-cis-B-1-[2-(α,p-dimethoxybenzyl)cyclohexyl]-piperidine in 20 ml. of isopropanol and adding 7.0 ml. of 1.2 N ethereal hydrogen chloride solution. The mixture was warmed on the steam bath until solution was complete, filtered and the filtrate diluted with 125 ml. of ether to give 2.55 g. of (−)-cis-B-1-[2-(α - p-dimethoxybenzyl)cyclohexyl]piperidine hydrochloride of melting point 227–228° C. and rotation $[\alpha]_D^{25}$ −58° in methanol.

*Analysis.*—Calcd. for $C_{20}H_{31}NO_2 \cdot HCl$ (percent): C, 67.87; H, 9.11; Cl, 10.02; N, 3.96. Found (percent): C, 67.46; H, 9.02; Cl, 10.05; N, 3.79.

(B) The mother liquor containing essentially the d-base, L-acid salt of above was concentrated in vacuo, the residue dissolved in 250 ml. of hot ethyl acetate and seeded with l-base, L-acid salt and allowed to stand for 24 hours at room temperature. A gum separated, the ethyl acetate was decanted off, and the gum washed with 25 ml. of ethyl acetate. The combined ethyl acetate (275 ml.) was seeded again with l-base, L-salt and put in the refrigerator at 5° C. for 48 hours. The solution deposited a gum, and the ethyl acetate was decanted off, and the gum washed with 25 ml. of ethyl acetate. The combined ethyl acetate (300 ml.) was concentrated in vacuo to give 15.85 g. of gum. The gum was converted to the free base with 5% aqueous sodium bicarbonate solution-methylene chloride. The organic layer which separated was washed with saturated sodium chloride, dried over anhydrous sodium sulfate and evaporated to give 6.2 g. of a white solid which was crystallized from 45 ml. of absolute ethanol to give 1.45 g. of material of melting point 105–107° C. This product was recrystallized from 10 ml. of absolute ethanol to give 1.17 g. of (+)-cis-B-1-[2-(α,p-dimethoxybenzyl)cyclohexyl]piperidine of melting point 106–107° C. and rotation $[\alpha]_D^{25}$ +65° (chloroform).

*Analysis.*—Calcd. for $C_{20}H_{31}NO_2$ (percent): C, 75.67; H, 9.84; N, 4.41. Found (percent): C, 75.57; H, 9.58; N, 4.34.

The hydrochloride of the d-base was prepared as shown above for the l-base in isopropanol and with ethereal hydrogen chloride. The (+)-cis-B-1-[2-(α,p-dimethoxybenzyl)cyclohexyl]piperidine hydrochloride had a melting point of 230–231° C. and rotation $[\alpha]_D^{25}$ +60° in methanol.

*Analysis.*—Calcd. for $C_{20}H_{31}NO_2 \cdot HCl$ (percent): C, 67.87; H, 9.11; Cl, 10.02; N, 3.96. Found (percent): C, 67.39; H, 9.45; Cl, 10.14; N, 3.98.

EXAMPLE 1

One thousand two-piece hard gelatin capsules for oral use, each capsule containing 250 mg. of the active ingredient of Preparation 12B is prepared from the following ingredients:

| | Gm. |
|---|---|
| (+)-cis-B-1-[2-(α,p-dimethoxybenzyl)cyclohexyl] piperidine hydrochloride | 250 |
| Talc | 50 |
| Calcium stearate | 2.5 |

The powdered materials are mixed thoroughly, then filled into hard gelatin capsules of appropriate size.

One capsule is administered to an adult human diabetic subject one, two or three times a day for the treatment of diabetes. Insulin secretion is thereby increased and blood sugar is reduced.

EXAMPLE 2

One thousand tablets for oral use, each containing 125 mg. of the active ingredient of Preparation 12B is prepared from the following ingredients:

| | Gm. |
|---|---|
| (+)-cis-B-1-[2-(α,p-dimethoxybenzyl)cyclohexyl] piperidine hydrochloride | 125 |
| Dicalcium phosphate | 100 |
| Methylcellulose, USP (15 cps.) | 6 |
| Talc | 25 |
| Magnesium stearate | 2.5 |

The powdered active material and dicalcium phosphate are mixed well, granulated with 7.5% w./v. solution of methylcellulose in water, passed through a No. 8 screen and dried carefully. The dried granules are passed through a No. 12 screen, mixed with the talc and stearate and compressed into tablets.

Following the above procedure, tablets are similarly prepared substituting 25, 75 and 200 gm. of the active material for the 125 gm. in the example to prepare tablets having 25, 75 and 200 mg. amounts, respectively.

Each of the foregoing tablets is administered to an adult human diabetic subject one, two or three times a day for the treatment of diabetes. Insulin secretion is thereby increased and blood sugar is reduced. Each of the foregoing tablets is administered to a hyperglycemic dog or cat once to lower the blood sugar level.

EXAMPLE 3

An aqueous oral preparation containing in each 5-milliliters (1 teaspoonful) 10 mg. of the active ingredient of Preparation 12B is prepared from the following ingredients:

|   | Gm. |
|---|---|
| (+) - cis - B - 1 - [2-(α,p-dimethoxybenzyl)cyclohexyl]piperidine hydrochloride | 20 |
| Methylparaben, U.S.P. | 7.5 |
| Propylparaben, U.S.P. | 2.5 |
| Saccharin sodium | 12.5 |
| Cyclamate sodium | 2.5 |
| Glycerin, 3,000 ml. | |
| Tragacanth powder | 100 |
| Orange oil flavor | 10 |
| F.D. and C. Orange dye | 7.5 |
| Deionized water, q.s., 10,000 ml. | |

One or two teaspoonfuls is administered to a juvenile human diabetic subject one, two or three times a day for the control of diabetes.

EXAMPLE 4

A sterile aqueous preparation suitable for intramuscular administration and containing 100 mg. of the base of Preparation 12B in each ml. is prepared from the following ingredients:

|   | Gm. |
|---|---|
| (+) - cis - B - 1 - [2α,p-dimethoxybenzyl)cyclohexyl]piperidine | 100 |
| Methylparaben, U.S.P. | 1.8 |
| Propylparaben, U.S.P. | 0.2 |
| Water for injection, q.s., 1,000 ml. | |

One milliliter is administered to an adult human diabetic subject each day for the control of diabetes. Five milliliters is administered to a hyperglycemic horse or cow each day to lower the blood sugar level.

EXAMPLE 5

The base and the hydrochloride salts of each of the products of Preparations 8, 11 and 12A can be substituted for the active ingredients of Examples 1, 2, 3 and 4 to produce dosage unit forms which can be used for the treatment of maturity onset and brittle diabetes mellitus in doses of one unit one, two, or three times per day.

What is claimed is:

1. A therapeutic composition for lowering blood sugar level comprising, in dosage unit form from about 10 mg. to about 300 mg. of an ether compound of the formula:

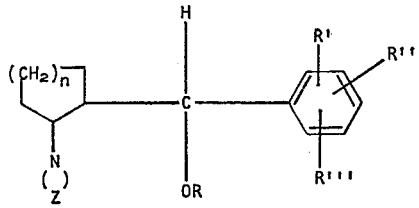

wherein $n$ has the value of 1 to 4, inclusive, wherein

represents a heterocyclic amino radical selected from the group consisting of pyrrolidino, piperidino, hexamethyleneimino and morpholino, inclusive, wherein R is alkyl containing from 1 to 6 carbon atoms, inclusive, wherein R', R" and R''' are selected from the group of substituents consisting of hydrogen, halogen, alkyl and alkoxy containing from 1 to 6 carbon atoms, inclusive, and $—CF_3$, the pharmaceutically acceptable acid addition salts, and N-oxides as an essential ingredient in association with a pharmaceutical carrier.

2. The composition of claim 1, wherein the active ingredient is (+)-cis-B-1-[2-(α,p-dimethoxybenzyl)cyclohexyl]piperidine hydrochloride.

3. The composition of claim 1, wherein the active ingredient is (+)-cis-B-1-[2-(α,p-dimethoxybenzyl)cyclohexyl]piperidine.

4. The composition of claim 1, wherein the active ingredient is cis-B-1-[2-(α,p-dimethoxybenzyl)cyclohexyl]piperidine hydrochloride.

5. The composition of claim 1, wherein the active ingredient is (−) - cis - B-1-[2-(α,p-dimethoxybenzyl)cyclohexyl]piperdine hydrochloride.

6. The composition of claim 1, wherein the active ingredient is cis-A-1-[2-(α,p-dimethoxybenzyl)cyclohexyl]piperidine hydrochloride methanol solvate.

7. The composition of claim 1, wherein the active ingredient is cis-B-1-[2-(α,ethoxy-p-methoxybenzyl)cyclohexyl]piperdine.

8. The composition of claim 1, wherein the active ingredient is cis-B-1[2-(α-ethoxy-p-methoxybenzyl)cyclohexyl]piperidine hydrochloride.

9. The composition of claim 1, wherein the pharmaceutical carrier is a solid.

10. The composition of claim 1, wherein the dosage unit form is a capsule comprising the active ingredient in combination with a pharmaceutical diluent enclosed by a gelatin sheath.

11. The composition of claim 1, wherein the dosage unit form is a tablet comprising a compressed mixture of the active ingredient in combination with a solid pharmaceutical carrier.

12. The composition of claim 1, wherein the carrier is an orally acceptable, flavored, fluid vehicle.

13. The composition of claim 1, wherein the composition is in a syrup form with a flavored, sweetened vehicle.

14. The composition of claim 1, wherein the composition is in an elixir form with a sweetened, flavored, alcoholic vehicle.

15. The composition of claim 1, wherein the composition is a sterile fluid injectable containing a non-antigenic carrier and a preservative.

16. A method of lowering blood sugar which comprises the administration of an effective amount to lower blood sugar of an ether compound of the formula:

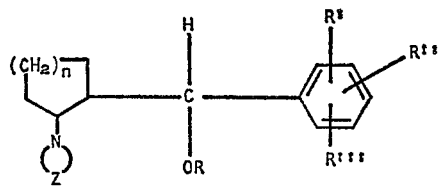

wherein $n$ has the value of 1 to 4, inclusive, wherein

represents a heterocyclic amino radical selected from the group consisting of pyrrolidino, piperidino, hexamethyleneimino and morpholino inclusive, wherein R is alkyl containing from 1 to 6 carbon atoms, inclusive, wherein R', R" and R''' are selected from the group of substituents consisting of hydrogen, halogen, alkyl and alkoxy containing from 1 to 6 carbon atoms, inclusive, and $—CF_3$, the pharmaceutically acceptable acid additional salts, and N-oxides, inclusive, to a hyperglycemic mammal subject.

17. The method of claim 16, wherein the compound is administered in the dosage unit form of claim 1.

18. The method of claim 16, wherein the compound is (+) - cis - B - 1-[2-(α,p-dimethoxybenzyl)cyclohexyl]piperidine hydrochloride.

19. The method of claim 16, wherein the compound is (+) - cis - B-1-[2-(α,p-dimethoxybenzyl)cyclohexyl]piperidine.

20. The method of treating diabetes which comprises the administration of an effective amount for lowering blood sugar of a dosage unit of the composition of claim 1 to a diabetic human subject.

21. The method of claim 20, wherein the active ingredient is (+)-cis-B-1-[2-(α,p-dimethoxybenzyl)cyclohexyl]piperidine hydrochloride.

22. The method of claim 20, wherein the active ingredient is (+)-cis-B-1-[2-(α,p-dimethoxybenzyl)cyclohexyl]piperidine.

References Cited

UNITED STATES PATENTS

| | | | |
|---|---|---|---|
| 3,135,745 | 6/1964 | Palopoli | 260—240 |
| 3,399,226 | 8/1968 | Saari | 260—471 |

JEROME D. GOLDBERG, Primary Examiner

U.S. Cl. X.R.

424—244, 248, 274